Patented Mar. 12, 1946

2,396,327

UNITED STATES PATENT OFFICE 2,396,327

METALLIZED AZO PIGMENTS

Donovan E. Kvalnes and Harold E. Woodward, Penns Grove, N. J., assignors to E. I. du Pont de Nemours & Company, Wilmington, Del., a corporation of Delaware No Drawing. Application July 31, 1941, Serial No. 404,838

10 Claims. (Cl. 260—146)

This invention relates to new metallized azo pigments, more particularly to new metallized azo pigments wherein the diazo component of the azo compound is a primary aromatic amine which is devoid of hydroxy groups ortho to amino, sulfonic acid and carboxyl groups; the coupling component is a compound of the 4-hydroxy-2-pyridone series; and a divalent metal having an atomic number of 24 to 30 is combined with the azo compound in the proportion of one molecular equivalent of the metal to two molecular equivalents of the pyridone radical.

The pigments are represented generally by the formula

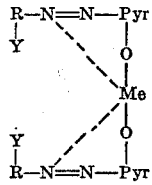

wherein Me represents the divalent metal, -Pyr-O- is the residue of a compound of the 4-hydroxy-2-pyridone series, such as, 4-hydroxy-2-quinolone, 4-hydroxy-N-methyl-2-quinolone, 4-hydroxy-7,8-benzo-quinolone or their tautomeric forms, such as 2,4-dihydroxy-quinoline; R- is the residue of a diazotizable arylamine; and each Y taken singly represents hydrogen and taken together they represent a second disazo group represented by the formula

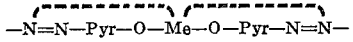

It has been discovered that when azo compounds of the kind indicated are metallized as by treating them with alkaline, neutral or slightly acid solutions of soluble divalent metal salts of the kind indicated, only one of the hydroxy groups of the pyridone radical enters into the combination and each atom of metal combines with two molecules of the azo pyridone. This characteristic of the indicated class of 4-hydroxy-2-pyridone azo compounds is surprising inasmuch as azo pigments are known where the coupling component has one hydroxy group, such as beta naphthol and two molecules of the compound combine with one atom of copper when they are metallized, such as the azo compound para nitro aniline→beta napthol. In that compound the hydroxy group reacts with the metal, and it is well known to the art that the products are browns, that they sublime at relatively low temperatures and that they have only moderately good fastness to light. In the compounds of the present invention only half of the hydroxy groups react with the metal. The sublimation temperature and light fastness of the products are relatively high. The new metallized products are insoluble in water, most solvents and most vehicles. The new products are excellent for use in a variety of products, such as lacquers for textile printing, inks, paints and coated paper.

It is among the objects of the invention to provide insoluble metallized azo compounds of high stability. Another object of the invention is to provide insoluble azo compounds having good fastness properties in respect to laundry tests and tests with solvents used in dry cleaning. A further object of the invention is to provide pigments in a variety of shades. Still other objects of the invention will be apparent from the following more detailed description.

The objects of the invention are attained in general by coupling the diazo of a diazotizable arylamine which is devoid of hydroxy groups ortho to the diazo group, sulfonic acid and carboxy groups, with a compound of the 4-hydroxy-2-pyridone series, and then reacting the azo compound with a soluble salt of a divalent metal having an atomic number of 24 to 30 in the proportion of one mol equivalent of the metal to two mol equivalents of the pyridone radical. Instead of metallizing after the coupling is complete, coupling and metallization can be carried out at the same time by having present a suitable non-deleterious solution of the metal salt in the diazo solution or in the solution of coupling component or in both.

The invention will be more fully set forth in the following more detailed description which includes examples that are given as illustrative embodiments of the invention and not as limitations thereof. Parts are expressed in parts by weight unless otherwise noted.

Example 1

Aniline (93 parts) was acidified with 91 parts of hydrochloric acid and diazotized with 69 parts of sodium nitrite in water solution. The diazo coupled at 10° C. by mixing it with a solution consisting of 161 parts of 2,4-dihydroxy-quinoline (which is tautomeric with 4-hydroxy-2-quinolone; Beilstein XXI, 171) dissolved with 40 parts of sodium hydroxide and 53 parts of sodium carbonate. A yellow coupling product was precipitated, filtered off and washed. The coupling product was then slurried in about 500 parts of water. Eighty-eight parts of nickel acetate were added, and then 250 parts of ammonium hydroxide sodilution were added. The charge was heated to 90° C. and held at this temperature for 3 hours. The product was a yellowish green pigment which was filtered off, washed and dried.

The pigment was incorporated in typical vehicles for the printing of textiles, such as water-in-lacquer, lacquer-in-water emulsions in which the lacquer phase contained pigment binding agents, and in aqueous systems containing film forming materials. Cotton cloth was printed with these pigmented vehicles and the prints were dried at 150° C. for 5 minutes. The greenish yellow prints were tested for light fastness by exposing them in a Fade-Ometer and compared on an equal basis with the best yellow pigments known to us which are used for lacquer printing of textiles. No fading was obtained with exposures which faded the prints made with the prior art pigments. The prints were fast to laundry tests and to solvents used in dry cleaning and in "trubenizing," such as gasoline, trichlorethylene, acetone and ethyl phthalate.

The same pigment was prepared by neutralizing the excess carbonate and bicarbonate after the coupling was completed and then adding 29 parts of nickel as nickel ammonium chloride. The mixture was heated to 90° C. until the metal complex was formed and then it was separated.

The monazo coupling formed in accordance with Example 1 was slurried in about 500 parts of water, 119 parts of nickel chloride ($NiCl_2.6H_2O$) and 272 parts of sodium acetate crystals were dissolved in the slurry and the mixture was heated at 90° C. for three hours. The metallized product made in this acid medium had a lighter masstone than that made in alkaline medium but its other properties were substantially the same.

The same product as that described in Example 1 was made by dissolving 119 parts of nickel chloride hexahydrate crystals in the solution of benzene diazonium chloride and then using a solution containing the dihydroxy quinoline and 80 parts of sodium carbonate instead of 53 parts as described in Example 1. The metallization was completed by heating from 1 to 3 hours at 90° C.

The metal complex was also formed by another modification of Example 1 wherein a solution of nickel ammonium chloride containing 29 parts of nickel was added to a solution containing 161 parts of dihydroxy quinoline and 40 parts of sodium hydroxide. When the coupling was completed the mixture was heated to 90° C. for 1 to 3 hours and then the metallized product was separated by filtration.

*Example 2*

Meta-nitro-aniline (138 parts) was used in place of 93 parts of aniline as described in Example 1. The pigment obtained gave a cotton print similar to that obtained in Example 1. This print had very good fastness to light as well as to other tests to which printed cotton may be subjected, such as hypochlorite, power laundry and organic solvent tests. As compared with a print made with the monazo pigment before treatment with nickel acetate, the print made with the nickel compound was much greener and it was much superior in all fastness tests.

*Example 3*

When para-nitro-aniline was used in place of the meta-nitro-aniline as described in Example 2, a pigment was obtained which gave a yellow print which was much redder and stronger than the print of Example 2, and it had extremely good fastness properties. Prints made from lacquer emulsions were exposed in the Fade-Ometer for unusually long periods without fading. The pigment was not removed from the print by treatment with trichlorethylene or other solvents used in the dry cleaning of textiles.

A wallpaper size containing china clay was prepared and 2% of this pigment based on the weight of china clay was added. The wallpaper brushout was exposed in the Fade-Ometer more than twice as long as wallpaper colors are usually tested for fading and there was no fading. The pigment was rubbed in lithographic varnish and extended with 30 parts of zinc oxide. The drawdown of this yellow tint was exposed in the Fade-Ometer for an excessively long time and it showed extremely good fastness properties.

Analysis of this pigment shows that it contains 1 atom of nickel to 8 atoms of nitrogen. It is represented by the following formula although it is not definitely known which hydroxyl group reacts with the metal.

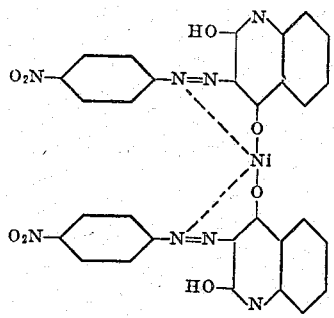

*Example 4*

By using 119 parts of hydrated cobaltous chloride crystals in Example 3 in place of 88 parts of nickel acetate, a pigment was obtained which gave yellowish brown prints on cotton and coatings on wallpaper. This pigment also had very good fastness properties which are comparable in excellence with the nickel compound of Example 3.

*Example 5*

By using 125 parts of hydrated cupric sulfate crystals in place of 88 parts of nickel acetate of Example 3, a pigment was obtained which gave brownish yellow lacquer prints on cotton and coatings on wallpaper. This pigment also had very good fastness properties.

*Example 6*

By using 118 parts of p-amino-benzo-nitrile in place of 93 parts of aniline as described in Example 1, a yellow pigment of very good light fastness was obtained. The cobalt compound of this monazo pigment was a brown shade having very good light fastness.

*Example 7*

A monazo pigment was made in a similar manner by diazotizing 468 parts of 2-amino-5-nitroanisol and coupling with 161 parts of 2,4-dihydroxy quinoline, followed by treatment with copper sulfate and ammonium hydroxide in the manner described in Example 1. The resulting copper compound was printed on cotton in a lacquer emulsion. It gave brown prints of very good fastness to light. Its other properties as shown by tests to which printed cotton is ordinarily subjected were also good.

The product is represented by the formula

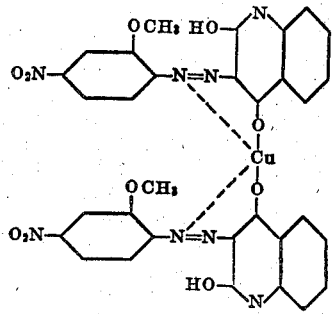

The pigment obtained in this example is not the same as that obtained when 2-amino-5-nitrophenol is used as the diazo component. Such an azo compound combines with copper mol for mol. It is not as fast to light and it is much more soluble in organic compounds than the compound of the present invention.

Example 8

By using 211 parts of 2,4-dihydroxy-5,6-benzo quinoline instead of 161 parts of 2,4-dihydroxy quinoline in Example 3, a pigment was obtained which gave on cotton yellow brown lacquer prints of good fastness properties. The formula of this pigment is represented by the formula

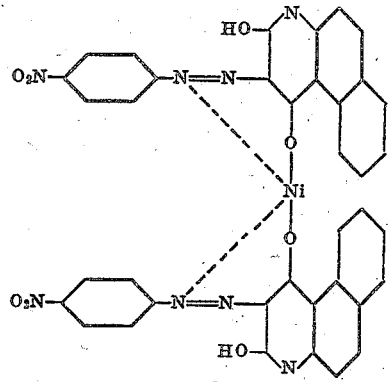

Example 9

By using 175 parts of 4-hydroxy-N-methyl-2-quinolone in place of 161 parts of 2,4-dihydroxy quinoline in Example 3, a brownish yellow pigment of good light fastness was obtained.

The product is represented by the formula

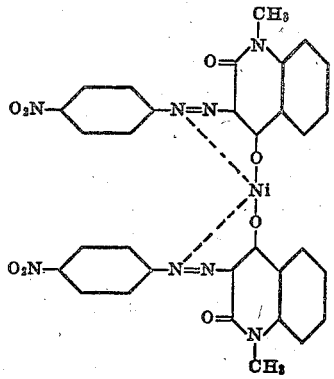

A corresponding pigment similar in properties was also made from 4-hydroxy-N-phenyl-2-quinolone.

Example 10

By using 151 parts of 2,4-dihydroxy-5,6-dihydro pyrindene in place of 161 parts of 2,4-dihydroxy quinoline in Example 3, a yellow brown product having good fastness to light was obtained. The compound is represented by the formula

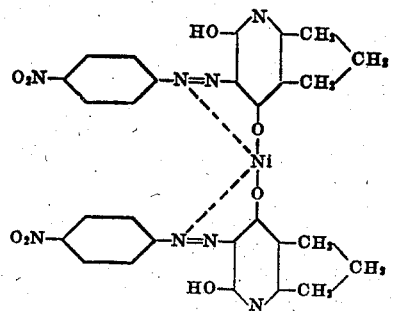

Example 11

By using 127.5 parts of para-chloro-aniline instead of 93 parts of aniline in Example 1, a pigment was obtained which was similar to that of Example 1 in color and fastness properties when printed on cotton. As compared with the pigment before metallizing, the nickel compound gives a print which is a much greener yellow and which was very good in all fastness properties. This nickel compound was ball-milled in nitrocellulose lacquer and mixed with a lacquer pigmented with aluminum powder. When this mixture was coated on a steel panel, a greenish gold color was obtained and this showed excellent stability when exposed to weather.

Example 12

By using 230 parts of 6 bromo-2,4-dihydroxy quinoline instead of 161 parts of 2,4-dihydroxy quinoline in Example 11, a yellow pigment was obtained which was redder than the pigment of Example 11, but approximately equal in fastness properties. This pigment is represented by the formula

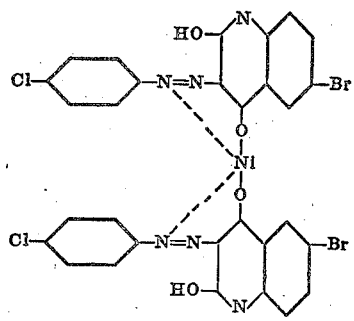

Example 13

By using 184 parts of benzidine, tetrazotizing and then coupling with two molecular equivalents of 2,4-dihydroxy quinoline in a manner similar to the process described in Example 1, a disazo compound was formed, filtered and washed.

The filter cake was slurried in water and then a solution containing 260 parts of copper sulfate crystals and 500 parts of concentrated ammonium hydroxide solution was added. The mixture was heated to 90° C. and held at this temperature for 3 hours. An orange-brown pigment was formed having very good fastness properties when used for textile printing. This pigment was ball milled in nitrocellulose lacquer and the pigmented lacquer was coated on a steel panel, giving a clean, deep brown which showed good stability when exposed to weather.

The product is represented by the formula

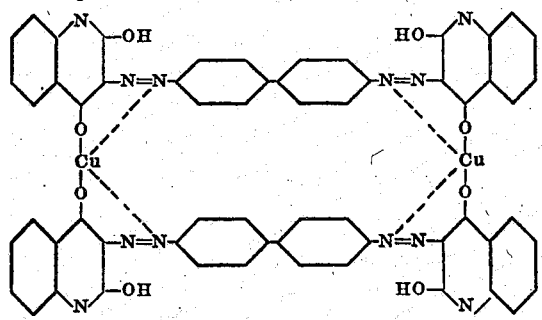

The following table shows the color of lacquer prints on cotton of metallized compounds of various other azo pigments which were obtained by coupling various diazotized primary aryl amines with 2,4-dihydroxy quinoline and metallizing in a manner similar to that described in the foregoing examples. These products had advantageous properties as indicated in the foregoing examples.

| Example | Diazo component | Metal | Color of print |
|---|---|---|---|
| 14 | p-Brom-aniline | Copper | Brownish yellow. |
| 15 | do | Nickel | Greenish yellow. |
| 16 | p-Anisidine | Copper | Brownish yellow. |
| 17 | p-Amino-diphenyl | do | Do. |
| 18 | p-Amino-diphenyl ether | do | Tan. |
| 19 | p-Amino-acetophenone | Nickel | Dull yellow. |
| 20 | p-Amino-benzophenone | Cobalt | Brownish yellow. |
| 21 | do | Nickel | Dull yellow. |
| 22 | p-Amino benzanilide | do | Brown. |
| 23 | do | Copper | Olive brown. |
| 24 | Sulfanilamide | Cobalt | Brown. |
| 25 | Alpha-naphthylamine | Copper | Yellow brown. |
| 26 | do | Nickel | Red brown. |

| Example | Diazo compound | Metal | Color of print |
|---|---|---|---|
| 27 | Beta-naphthylamine | Nickel | Dull yellow. |
| 28 | 4-nitro-1-naphthylamine | Copper | Olive. |
| 29 | Amino azo benzene | do | Yellow brown. |
| 30 | do | Cobalt | Do. |
| 31 | do | Nickel | Do. |
| 32 | Amino azo toluene | Copper | Do. |
| 33 | do | Cobalt | Red brown. |
| 34 | 4-nitro aniline ⟶ cresidine | do | Do. |
| 35 | do | Nickel | Do. |
| 36 | Benzidine | Cobalt | Do. |
| 37 | do | Nickel | Do. |
| 38 | 2,2'-dichlor benzidine | Copper | Yellow brown. |

*Example 39*

The monazo coupling made in accordance with Example 1 was slurried in sufficient water to make a volume of about 10,000 parts. To this slurry was added 525 parts of a molar solution of nickel chloride and 525 parts (5 moles) of diethanolamine. The mixture was then heated to 90° and stirred for three hours at this temperature. During the first hour the color changed from a bright yellow to a dark green. The dark green pigment was filtered and washed until the filtrate was neutral. During the washing the color changed to a red brown. This pigment, when rubbed in lithographic varnish, gave an ink of red-brown masstone and undertone with good tinting strength. This brown ink showed excellent light fastness when exposed in a Fade-Ometer and was practically equal in this respect to the greenish yellow ink obtained when the metallization was carried out in the presence of ammonia or sodium acetate.

The following table shows the appearance of inks which were made from pigments prepared in accordance with Example 39 except that a different "buffer" or "acid acceptor" was used and different proportions were used as indicated:

| Example | Buffer or acid acceptor | Moles | Masstone | Tint |
|---|---|---|---|---|
| 40 | Mono ethanolamine | 2 | Light brown | Brown. |
|  |  | 10 | Brown | Weak brown. |
| 41 | Diethanolamine | 2 | do | Brown. |
|  |  | 10 | do | Do. |
| 42 | Triethanolamine | 2 | Dark brown | Yellow brown. |
|  |  | 10 | Brown | Brown. |
| 43 | Diethylamine | 2 | Olive | Dull yellow. |
|  |  | 10 | Red brown | Red brown. |
| 44 | Triethylamine | 2 | Olive | Brownish yellow. |
|  |  | 10 | Light brown | Brown. |
| 45 | Diethylamino ethanol | 2 | Olive | Brownish yellow. |
|  |  | 10 | Brown | Brown. |
| 46 | Ethylene diamine | 2 | Light olive | Greenish yellow. |
|  |  | 10 | do | Do. |
| 47 | Triethylene tetramine | 2 | Dull yellow | Weak yellow. |
|  |  | 10 | do | Do. |
| 48 | Glycine | 2 | Brown | Brown. |
|  |  | 10 | Yellow | Yellow. |
| 49 | Methyl glucamine | 2 | Dark brown | Brown. |
|  |  | 10 | do | Do. |
| 50 | Aniline | 2 | Dull green | Greenish yellow. |
|  |  | 10 | Olive brown |  |
| 51 | Dimethyl aniline | 2 | Yellow brown | Dull yellow. |
|  |  | 10 | Orange brown | Weak orange. |
| 52 | Phenyl ethanolamine | 2 | Olive brown | Dull yellow. |
|  |  | 10 | Red brown | Brown. |
| 53 | Benzylamine | 2 | Green | Greenish yellow. |
|  |  | 10 | Dark brown | Brown. |
| 54 | Pyridine | 2 | Light olive | Greenish yellow. |
|  |  | 10 | Dark brown | Weak brown. |
| 55 | Quinoline | 2 | Olive | Greenish yellow. |
|  |  | 10 | Red brown | Brown. |
| 56 | Piperidine | 2 | Olive | Greenish yellow. |
|  |  | 10 | Red brown | Red brown. |
| 57 | Morpholine | 2 | Dark brown | Yellow brown. |
|  |  | 10 | Brown | Brown. |
| 58 | Urea | 2 | Light green | Greenish yellow. |
| 59 | Na$_2$HPO$_4$ | 2 | Brown | Brown. |
| 60 | (CH$_3$)$_4$NOH | 2 | Red brown | Do. |
|  |  | 8 | Light brown | Do. |

Example 61

The monazo coupling made in accordance with Example 1 was filtered, washed with alcohol, and slurried in about 5000 parts of alcohol. To this slurry was added 525 parts of a molar solution of nickel chloride and 272 parts of sodium acetate crystals. The color changed from a bright yellow to a reddish brown at room temperature. After heating to 75–80° for two hours, the pigment was filtered and washed.

When tested in lithographic varnish or in lacquer printing on cotton, this pigment gave a brown ink or print; and it was comparable in fastness properties to the greenish yellow obtained when the metallization was carried out in a water suspension in the presence of sodium acetate. A similar brown pigment was obtained when the metallization was carried out in alcohol with other acid neutralizing agents, such as ammonia or diethanolamine.

Example 62

The monazo coupling made in accordance with Example 3 was slurried in sufficient water to make a volume of about 6000 parts. To this slurry was added 525 parts of a molar solution of nickel chloride and 160 parts (2 moles) of pyridine. After the mixture was stirred at 90° for three hours, the pigment was filtered and washed. It gave inks and textile prints similar in shade and fastness properties to those obtained from the pigment metallized in the presence of ammonia. When five times as much pyridine was used, the pigment obtained gave an ink with a dull yellow masstone instead of dull green and the tint was a much redder yellow. When other amines were used, such as mono, di, or tri-ethanolamine or di or tri-ethylamine, the pigments obtained showed slight variations in the masstone or tint of the inks, but the variations were not so extreme as in the case of the pigment of Example 1.

Example 63

The disazo compound obtained as in Example 13 was metallized with copper sulfate in the presence of other acid buffers than ammonia, including mono, di, or tri-ethanolamine, di or tri-ethylamine, pyridine, urea, and sodium acetate. The pigments obtained were browns of slightly different hue but of practically the same fastness properties.

The pigments of the present invention are less soluble in organic solvents, such as the solvents used in dry cleaning fabrics than metallized types which are similar except that the diazo components have a hydroxy group ortho to the azo bridge and consequently combine with one molecule of metal per molecule of azo compound.

Any cyclic amine of the benzene, naphthalene, diphenyl heterocyclic or azo benzene series which is capable of diazotization can be used as the diazo component, provided it does not have a hydroxy group ortho to an azo bridge when it is coupled, a free sulfonic acid group or a free carboxy group. The nucleus may be unsubstituted or it may be substituted in any or all unsubstituted positions by any monovalent group other than hydroxy, sulfonic acid or carboxy, such as alkyl, alkoxy, aryl, aryloxy, halogen, nitro, —CO-alkyl, —CO-aryl, —COHN-aryl, —SO₂NH₂, cyano and others. As representative of the many diazotizable amines which can be used as the diazo component in making the compounds of the invention are mentioned 3-nitro-4-chlor-aniline, 2-nitro-4-amino-toluene, 2-chlor-4-amino- phenetole, 2-nitro-benzidine, dianisidine, thioaniline, 4,4'-diamino-benzophenone, benzidine sulfone, diamino diphenylamine, beta-amino anthraquinone, 2-amino-5-methyl thiazole, 2-amino-benzothiazole, 2-amino-6-ethoxy-benzothiazole, 5-amino-quinoline, 6-amino-quinoline, 1-phenyl-3-methyl-4-amino-5-chloro pyrazol, ortho-, meta- and para-toluidines, -xylidines, -anisidines and -phenetidines, ortho-, meta- and para-chloro- (and -bromo-)anilines, 4-chlor-2-amino-toluene, chloro-anisidines and -phenetidines, nitro-toluidines and anisidines such as 2-nitro-4-amino-toluene and 2-nitro-4-amino-anisol, amino-phenyl sulfones such as 4-amino-phenyl-methyl-sulfone, 3-amino-phenyl-ethyl-sulfone and 4-amino-diphenyl-sulfone, m- and p-amino-acetanilide, 2-, 3- and 4-amino diphenyl, 2-, 3- and 4-amino-diphenyl ether, m- and p-aminophenyl urea, o-, m- and p-amino-phenyl sulfon-dimethyl-amide, o-, m- and p-amino-benzamide, p-amino-acetanilide → m-toluidine, p-amino-acetanilide → cresidine, p-amino-acetanilide → 2,5-dimethoxy aniline, p-anisidine → m-toluidine, p-anisidine → 2,5-dimethoxy aniline, o-anisidine → alpha naphthylamine, m-nitro acetanilide → 2,5-dimethoxy aniline, aniline → m-anisidine, aniline → m-amino acetanilide, alpha-amino tetronic acid, 3-amino-2,5-diphenyl pyrrol, 2-methyl-3-amino-indol, 4-amino-1,3,5-trimethyl pyrazol, 3-amino-indazol, 4-amino-antipyrine, 5-amino-1,2,4-triazol, 2-phenyl-4,5-diamino-triazol, 1-phenyl-5-amino-triazol, 5-amino-tetrazol, 3-amino-pyridine, 2-chloro-5-amino-pyridine, 1-methyl-2-phenyl-3-amino-indole, 3-amino-quinoline and 2-methyl-3-amino-quinoline.

Any compound of the 4-hydroxy-2-pyridone series which includes their tautomeric forms but which are devoid of water solubilizing groups such as carboxylic and sulfonic acid groups can be used. Such compounds are represented in general by the formula

wherein R represents one of a group consisting of hydrogen, phenyl, cyclohexyl and alkyl having 1 to 8 carbons; X and X' taken separately are each one of a group consisting of hydrogen, alkyl having 1 to 2 carbons, halogen and nitro and taken together they represent an isocyclic group and its halogen, methyl, methoxy, ethoxy and benzo derivatives.

As illustrative of other compounds which can be used as coupling components to make combinations having in general the properties of the compounds hereinbefore described are 2,4-dihydroxy-7-chlor-quinoline, 2,4-dihydroxy-7-nitro-quinoline, 2,4-dihydroxy-7,8-benzo-quinoline, N-butyl-4-hydroxy-2-quinolone, N-octyl-4-hydroxy-2-quinolone, N-cyclohexyl-4-hydroxy-2-quinolone, N(4'-methyl-cyclohexyl)-4-hydroxy-2-quinolone, N-phenyl-4-hydroxy-2-quinolone, 2,4-dihydroxy-6-methyl-quinoline, 2,4-dihydroxy-7-methoxy-quinoline, 2,4-dihydroxy-7-ethoxy-quinoline and 2,4-dihydroxy-5,6,7,8-tetrahydro-quinoline.

Any water-soluble salt of a bivalent metal having an atomic number of 24 to 30 can be used as the metallizing agent, such as nickel, cobalt, copper, chromium, manganese, iron and zinc. Among the most fast to light colors are those derived from 2,4-dihydroxy quinoline. The products which are metallized with nickel, cobalt or copper are better than the others with respect to light fastness and among these, nickel gives compounds having in general better light fastness than any of the others.

Many variations can be made in the methods of making the initial coupling product. These methods are in general well known in the art, and many variations in properties can be made by varying the diazo components. For example, satisfactory mixed diazo components from the class described can be used instead of a single primary arylamine. The metallization can be carried out with the salt of one metal or with the salts of more than one metal of the class described in order to make other variations in the products. These mixed pigments have the same general properties as those in which the components are not mixed but small variations to suit special needs can be made in this way.

As hereinbefore indicated, the metallization can be attained without isolating the coupling product, the metal may be present during the coupling or slightly acid to slightly alkaline media can be used over a considerable range of temperature. Still other variations comprise making use of other alkaline reagents (acid acceptors) instead of ammonium compounds in the metallization of the coupled compounds such as diethanolamine or pyridine. A variation in shade which is frequently effected by varying the alkaline reagent is believed to be due to variation in the degree or kind of coordinated molecule, or to variation in the physical form of the metallized pigment. The time and temperature of the metallization can be varied considerably. The metallization can be effected at temperatures below 80° C. but at temperatures of about 80° C. the metallization is satisfactory and fairly expeditious. At temperatures of about 90° C. and higher the metallization is quite rapid. Temperatures above 100° C. can be used if the mixture is confined under pressure. The physical form of the pigment is improved by heating for an hour or more at and above 90° C.

As illustrative of other alkaline reagents or acid acceptors which can be used instead of diethanolamine or pyridine are propylamine, mono, di and tri-methylamine, ethylamine, formamide, acetamide, dimethyl formamide, hexylamine, cyclohexylamine, methyl glucamine, taurine, beta-dimethyl amino propanol sulfonic acid, toluidines, xylidines, naphthylamines, diphenylamine, piperazine, dimethyl sulfanilic acid, melamine, pyrrole, indole, carbazole, hexa methyleneimine, hexa methylene tetramine, mono and di-methyl glycine, dimethylol urea, sodium formate and sodium oxalate, potassium glycolate, potassium gluconate, potassium tartrate, sodium citrate, sodium maleate, sodium succinate and sodium chloracetate.

Besides carrying out the metallizations in aqueous or in alcoholic medium, other media may be used, such as methyl, propyl, isopropyl, octyl alcohols, ethylene glycol, Cellosolve, dibutyl ether, acetone, ethyl acetate benzene, o-dichlorbenzene, nitro benzene, cyclohexanol. The various amines given above may also be used as media for the metallizations. It is possible to effect the metallizations under pressure or at atmospheric pressure.

From the foregoing disclosure it will be recognized that the invention is susceptible of modification without departing from the spirit and scope thereof and it is to be understood that the invention is not restricted to the specific illustrations thereof herein set forth.

We claim:
1. A symmetrical azo pigment represented by the formula:

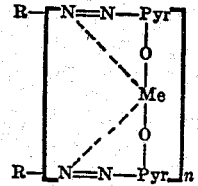

wherein each R is the nucleus of a diazotizable cyclic amine which is devoid of an hydroxy group ortho to the azo bridge, sulfonic acid and carboxylic acid groups; n is 1 to 2; Me is a divalent metal having an atomic number 24 to 30 and —Pyr—O— is the residue of a compound which is devoid of carboxylic and sulfonic acid groups which is represented by the formula

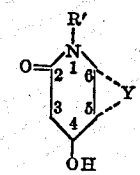

wherein R' is one of the group consisting of hydrogen, phenyl cyclohexyl and alkyl having 1 to 8 carbons and ----Y---- together with carbons numbered 5 and 6 belong to an isocyclic ring of the group consisting of phenyl and naphthyl residues and the halogen, nitro, alkyl, and alkoxy derivatives of said phenyl residue.

2. An azo pigment represented by the formula

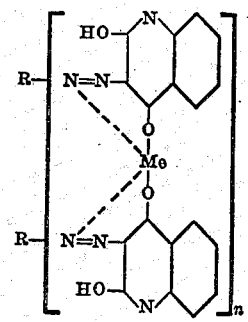

wherein each R is the nucleus of a diazotizable cyclic amine which is devoid of an hydroxy group ortho to the azo bridge, sulfonic acid and carboxylic acid groups; n is 1 to 2; and Me is a divalent metal having an atomic number of 24 to 30.

3. An azo pigment in accordance with claim 2 in which Me represents nickel.

4. An azo pigment represented by the formula

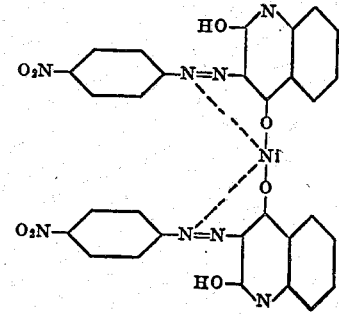

5. An azo pigment represented by the formula

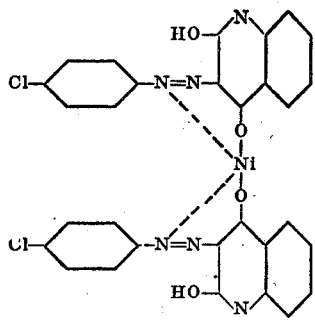

6. An azo pigment represented by the formula

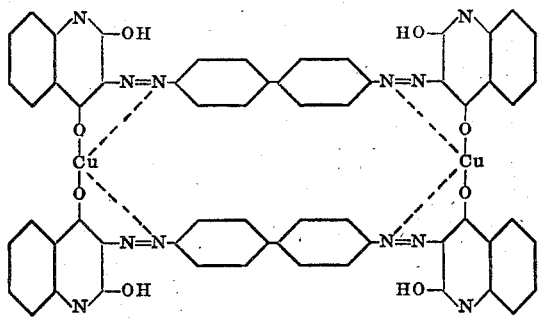

7. The process which comprises heating a slightly acid to alkaline slurry of an azo compound represented by the compound

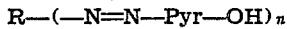

R—(—N=N—Pyr—OH)$_n$ wherein $n$ is 1 to 2, R is the nucleus of a diazotizable cyclic amine which is devoid of hydroxy groups ortho to the azo bridge, sulfonic acid and carboxylic acid groups and —Pyr— is the residue of a compound which is devoid of carboxylic and sulfonic acid groups and is represented by the formula

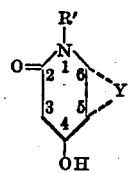

wherein R' is one of a group consisting of hydrogen, phenyl, cyclohexyl and alkyl having 1 to 8 carbons, and ----Y---- together with carbons numbered 5 and 6 belong to an isocyclic ring of the group consisting of phenyl and naphthyl and the halogen, nitro, alkyl, and alkoxy derivatives of said phenyl residue; said slurry being heated in the presence of at least one equivalent of a salt of a divalent metal having an atomic number of 24 to 30 until a metal complex is formed which is represented by the formula:

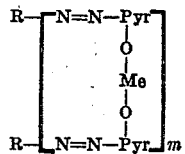

wherein Me represents the metal and $m$ is 1 to 2.

8. The process in accordance with claim 7 wherein —Pyr— is the nucleus 2,4-dihydroxy quinoline.

9. The process in accordance with claim 7 in which Me represents nickel.

10. The process in accordance with claim 7 in which the minimum temperature of the metallization medium during the major part of the metallization is about 90° C.

DONOVAN E. KVALNES.
HAROLD E. WOODWARD.